United States Patent
Diels (10) Patent No.: US 8,915,266 B2
(45) Date of Patent: Dec. 23, 2014

(54) FLEXIBLE STRETCH HOSE

(75) Inventor: Domin Diels, Gierle (BE)

(73) Assignee: Plastiflex Group, Paal-Beringen (BE)

( * ) Notice: Subject to any disclaimer, the term of this patent is extended or adjusted under 35 U.S.C. 154(b) by 220 days.

(21) Appl. No.: 13/505,107

(22) PCT Filed: Oct. 22, 2010

(86) PCT No.: PCT/IB2010/054799
§ 371 (c)(1),
(2), (4) Date: Dec. 3, 2012

(87) PCT Pub. No.: WO2011/051870
PCT Pub. Date: May 5, 2011

(65) Prior Publication Data
US 2013/0068334 A1 Mar. 21, 2013

(30) Foreign Application Priority Data

Oct. 29, 2009 (BE) .................................. 2009/0662
Dec. 11, 2009 (BE) .................................. 2009/0786
Dec. 15, 2009 (CN) ........................... 2009 1 0261439

(51) Int. Cl.
*F16L 11/16* (2006.01)
*F16L 11/15* (2006.01)
*F16L 11/24* (2006.01)
*H02G 3/04* (2006.01)

(52) U.S. Cl.
CPC ................. *F16L 11/15* (2013.01); *F16L 11/16* (2013.01); *F16L 11/24* (2013.01); *H02G 3/0468* (2013.01)
USPC .............. 138/122; 138/118; 138/119; 15/314

(58) Field of Classification Search
CPC ........... B29D 23/18; F16L 11/16; F16L 11/14
USPC .............................. 138/118, 119, 121; 15/314
See application file for complete search history.

(56) References Cited

U.S. PATENT DOCUMENTS 2,337,374 A * 12/1943 Chernack ....................... 138/134
2,949,133 A * 8/1960 Rothermel et al. ........... 138/122
(Continued)

FOREIGN PATENT DOCUMENTS

| CN | 1470213 A | 1/2004 |
| DE | 103 24 887 A1 | 12/2004 |

(Continued)

OTHER PUBLICATIONS

International Search Report for PCT/IB2010/054799 dated Jan. 3, 2011.

*Primary Examiner* — Patrick F Brinson
(74) *Attorney, Agent, or Firm* — Sughrue Mion, PLLC (57) ABSTRACT

A flexible stretch hose with a wall which comprises a spirally wound profile (1; 11; 21) in a plastic material. Consecutive windings of the profile are secured to each other by means of a weld. The profile comprises, in cross-section, at least one bottom section (2; 12) and at least one rib section (4; 14; 24), wherein the rib section of the profile, relative to the bottom section, also forms a protrusion of the wall of the hose which gives the hose a predetermined hub strength. The profile comprises an unfoldable section (5; 15; 25) provided in order to be unfolded under the influence of a tensile; force in the axial direction of the hose, thereby allowing an extension of the hose, wherein the unfoldable section comprises at least two profile sections lying loosely against each other, which sections are interconnected at one end.

14 Claims, 9 Drawing Sheets

(56) References Cited

U.S. PATENT DOCUMENTS

| | | | |
|---|---|---|---|
| 3,080,891 A * | 3/1963 | Duff | 138/122 |
| 3,255,780 A | 6/1966 | Squirrell | |
| 3,486,532 A * | 12/1969 | Sawada | 138/122 |
| 3,861,424 A * | 1/1975 | Mizutani et al. | 138/119 |
| 4,471,813 A | 9/1984 | Cothran | |
| 5,555,915 A * | 9/1996 | Kanao | 138/133 |
| 6,024,132 A * | 2/2000 | Fujimoto | 138/122 |
| 7,520,302 B2 * | 4/2009 | Smith | 138/118 |
| 2004/0016469 A1 | 1/2004 | Lee | |
| 2008/0245435 A1 | 10/2008 | Weiss et al. | |
| 2010/0206419 A2 | 8/2010 | Weiss et al. | |

FOREIGN PATENT DOCUMENTS

| | | | |
|---|---|---|---|
| DE | 10 2007 016784 A1 | 10/2008 | |
| FR | 1 013 192 A | 7/1952 | |
| GB | 1 419 841 A | 12/1975 | |
| GB | 1419841 A * | 12/1975 | |

* cited by examiner

SECTION A-A
*Fig. 1*

SECTION A-A
*Fig. 2*

SECTION A-A

FLEXIBLE STRETCH HOSE

This invention relates to an extendible flexible hose according to the preamble to the first claim.

In the vacuum cleaner market, for example, flexible plastic hoses are used to suck up dust present in houses and buildings and transfer it to the vacuum cleaner. The present hoses used for this application are manufactured from plastic with characteristics of being flexible, crushproof, resistant (they spring back more than 95% when someone stands on them), smooth on the inside and in that they do not collapse under the vacuum on the inside during use.

The hoses can be manufactured from a profile that is extruded and is spirally wound. The profile has a well defined shape for conforming to the above-mentioned characteristics. The profile is cooled, and then wound spirally by means of special tooling. During the spiral winding a joining agent can be applied between the interlocking profile parts.

This joining agent may, for example, be hot, molten plastic, IR, laser, hot air, glue or other techniques used to join together the plastic. The flexible hose thus produced is cut to length and provided with the end pieces required to enable the hose to be connected to the vacuum cleaner and the handle or other tooling.

These flexible hoses are in most cases used together with a cylinder vacuum cleaner.

Another type of hose, called the stretch or extendible hose, is in most cases used together with an "upright" vacuum cleaner. This vacuum cleaner has no vacuum cleaner hose in normal use because the suction nozzle is directly connected to the extension tube and this extension tube is connected directly to the motor section of the vacuum cleaner.

The stretch hose is then used when, for example, something has to be sucked up which is higher than floor level. It is then difficult to lift the entire vacuum cleaner. The stretch hose is an accessory for the upright vacuum cleaner and is in most cases mounted on the vacuum cleaner itself. This stretch hose is made with a spirally wound spring wire between which a profile of plastic material is extruded. The profile is shaped so that it is folded up under and between the spring wire windings, and so that when a force is applied in the axial direction of the hose, the profile stretches. Due to the force of the spring wire the hose will again assume its original short length when the force of extension is removed.

The disadvantage of these hoses is that they are heavy due to the weight of the spring wire. Another disadvantage is that the force for stretching the spring further increases in proportion to the stretched length. This is unfavourable for the use of the hose on a cylinder vacuum cleaner, for as the hose is increasingly stretched, not only the force of extension increases but also the force required to re-compress (shorten) the hose. This force, together with the recuperating force which is generated by the vacuum on the inside of the hose, causes the cylinder vacuum cleaner to be moved towards the operator and may possibly strike against the heels or legs of the operator, which is of course undesirable.

In certain applications there are also stretch hoses on the market which are not produced with steel spring wire but with a hard plastic coil instead. The disadvantage of the hard plastic coil is that it may be deformed if the hose is stepped on. It then no longer springs back, causing the inside diameter to narrow, which is unfavourable to the transfer of dust through the hose.

The materials of the flexible hoses (for cylinder vacuum cleaners) are selected so that if the hose is stepped on, it springs back almost 100%, resulting in no narrowing of the inside diameter.

These hoses can only be extended to a limited extent if the hose is pulled in the axial direction. A normal value ranges from 10 to 60%. On the other hand, the stretch hoses can be stretched much more up to a factor, normal for the market, of approximately 1 in 2 or 1 in 6 (i.e. 200% to 600% extension).

The object of the invention is to provide a hose which remedies one or more disadvantages of the aforementioned start of the art.

This object is achieved with a flexible stretch hose which has the characteristics described in claim 1.

The hose according to the invention has, in particular, an unfoldable section in the spirally wound profile by means of which the hose can be stretched in the axial direction under the influence of an axial tensile force.

The profile of the hose of the invention has, in cross-section, at least one bottom section and at least one rib section, i.e. one bottom section and one rib section, or two bottom sections alternating with two rib sections (double pitch) or more. The rib section of the profile at the same time forms a protrusion of the wall of the hose relative to the bottom section. This rib section determines the hub strength of the hose, i.e. the extent to which the hose is resistant to compression and springs back to its original shape when a compressive force is removed. In the hose according to the invention it is possible to render this rib section less flexible and even solid, because the flexibility is in this case maintained by the stretchability of the unfoldable section. This means that the same hub strength can be obtained with a rib of smaller dimensions, and consequently with less plastic material, which is beneficial in terms of the cost price of the hose.

In preferred embodiments of the invention the hose has essentially the characteristics of an ordinary vacuum cleaner hose, and is also stretchable, just as a stretch hose, up to preferably at least 200% (relative to the length in the unstretched condition), and more preferably up to 600% or even more (e.g. up to 10× the unstretched length). Obviously the invention is not limited merely to vacuum cleaner hoses; it may also be used on any other type of flexible or stretch hose for any other application, for example ventilation, cleaning of swimming pools, respiration or other medical applications, etc.

In preferred embodiments of the invention a recuperating effect is built into the unfoldable section, causing the unfoldable section to return to the unstretched condition when the tensile force on the hose is removed. This recuperating effect can be obtained by means of predetermined characteristics inherent in the plastic material from which the profile is produced (a "shape memory" of the material), or because the unfoldable section is designed as a folded up straight section of the profile, or a combination of both.

The invention will be explained in greater detail with reference to the description below and the attached figures in which preferred designs of hoses according to the invention are described.

The hoses according to the invention are manufactured by spirally winding a specially developed profile which has characteristics that allow an extra extension of the hose. This may be a combination of one or more characteristics that are described below. The hose according to the invention can be produced on the basis of existing methods for manufacturing vacuum cleaner hoses by spirally winding a profile, subject to a few adaptations.

Figure 12:
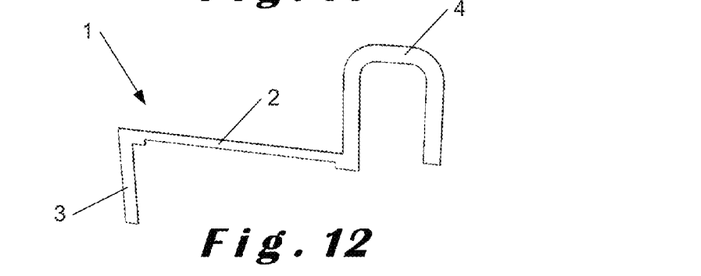
FIG. 12 shows the cross-section of a profile of a hose according to the invention during the production process, with a straight section of the bottom section before it is folded up to form the unfoldable section.

In order to build the stretchability into the profile the bottom of the profile can be made longer, and possibly thinner or thicker, with a section being bent during winding, e.g. in the embodiment shown in FIGS. 1-4. In the "die" of the extruder bottom 2 of profile 1 is made straight and the profile is cooled in this shape during extrusion (in the shape shown in FIG. 12). During winding, a section of bottom 2 of the profile is bent at an angle of 180° to the bending point, for example approximately in the centre of the bottom. Welded leg 3 then returns vertically to the edge of protrusion 4 enabling it to be welded spirally in exactly the same way as for the profiles of the existing vacuum clear hoses. Of course, it is also possible to weld to other points, e.g. on a horizontal section of the profile or a combination of horizontal and vertical, or on a sloping section.

Figure 1:
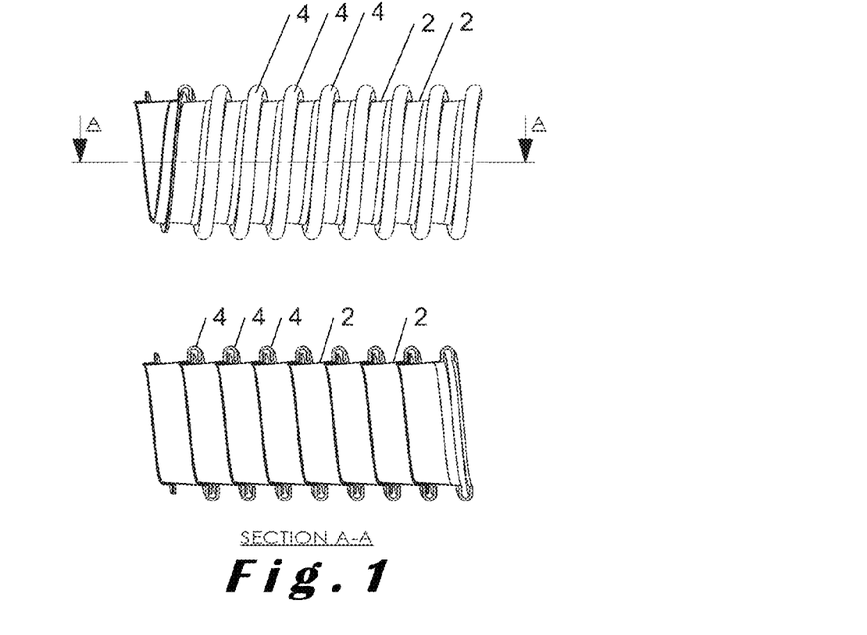
FIG. 1 shows a first preferred design of a hose according to the invention in a side view and cross-section in the unstretched, folded up condition.
Figure 2:
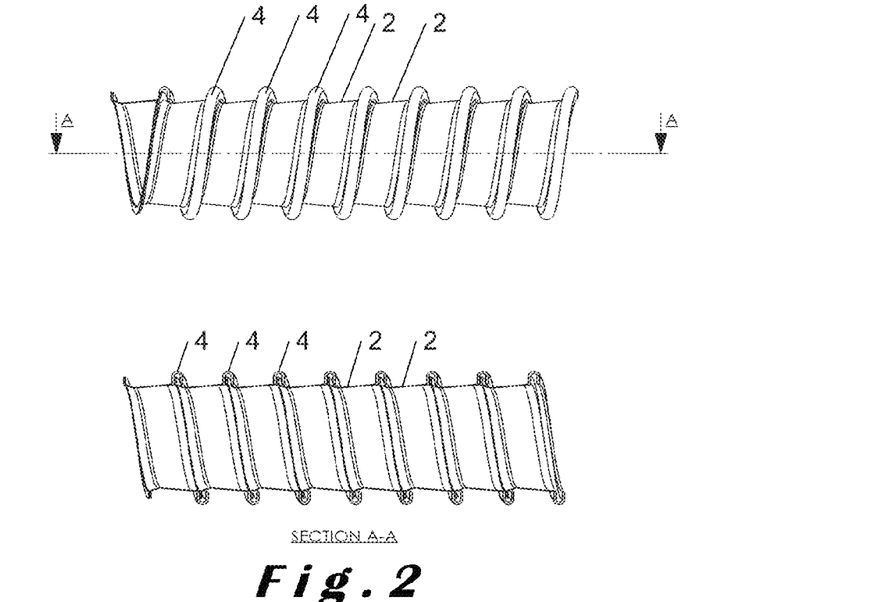
FIG. 2 shows the hose in FIG. 1 in the stretched, unfolded condition.

Because bottom 2 of profile 1 is made longer, and is bent (folded up) during winding, extra length is created in an unfoldable section 5 on the inside of the profile (i.e. the inner wall of the hose). This length will be stretched out when the hose is pulled. However, the hose still retains its capacity to resume its original closed shape without any extra external force. This is due to the fact the materials used to produce the hose have an inherent recuperating effect. Because the bottom of the profile is bent, a tension is also generated in the bottom. This tension, and the fact that the material wants to return to its original straight shape, ensure that the hose returns to its original closed condition. The recuperating force is also generated by the spiral winding of the profile itself, but this force is very small relative to the forces built up in the bottom. By varying the thickness and length of the bottom the recuperating force can be predetermined.

Another advantage of this design is that the force of extension does not increase or increases less compared to a spring such as that in the stretch hoses of the prior art. The force for stretching the bottom derives from the bottom itself and not from the spring coil, as in the case of a stretch hose. When a cylinder vacuum cleaner is used the risk that the cylinder vacuum cleaner may be pulled towards the operator is therefore greatly reduced. Another advantage is that, because the profile is produced from the same material as that used for vacuum cleaner hoses, the hose assumes almost totally its original shape if it is stepped on. The extra built-in length has no adverse effect on the recuperability of the hose.

Because of the choice of material and design of the bottom, the recuperating force will decrease, or will decrease less quickly, in the course of time.

Figure 3:
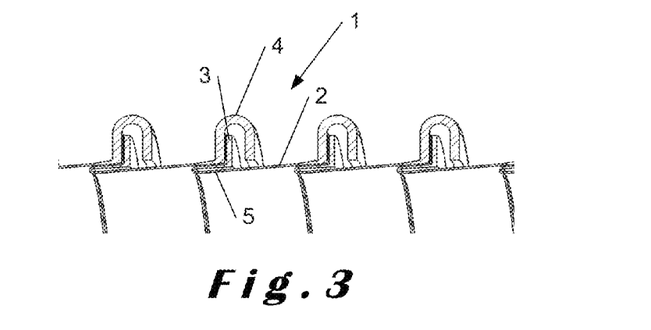
FIGS. 3 and 4 show respectively a detail shown in FIGS. 1 and 2.
Figure 4:
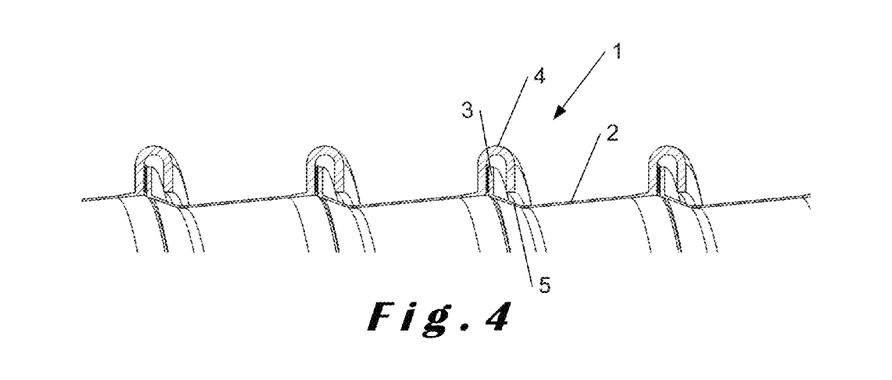
Figure 5:
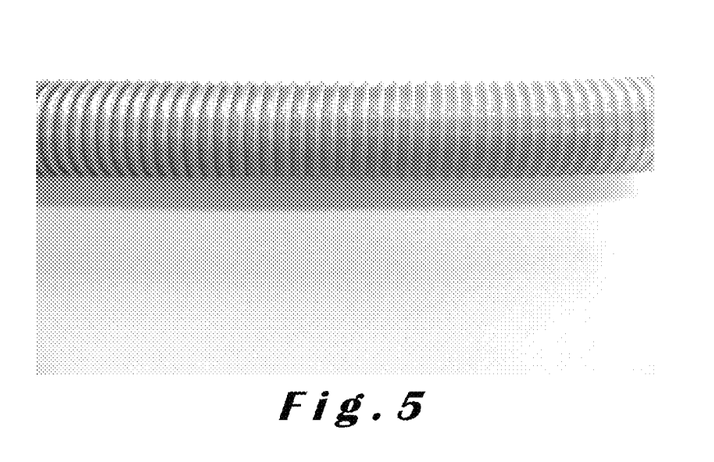
FIGS. 5 and 6 show photographs of a hose according to the embodiment shown in FIGS. 1 and 2, in the unstretched and stretched condition respectively.
Figure 6:
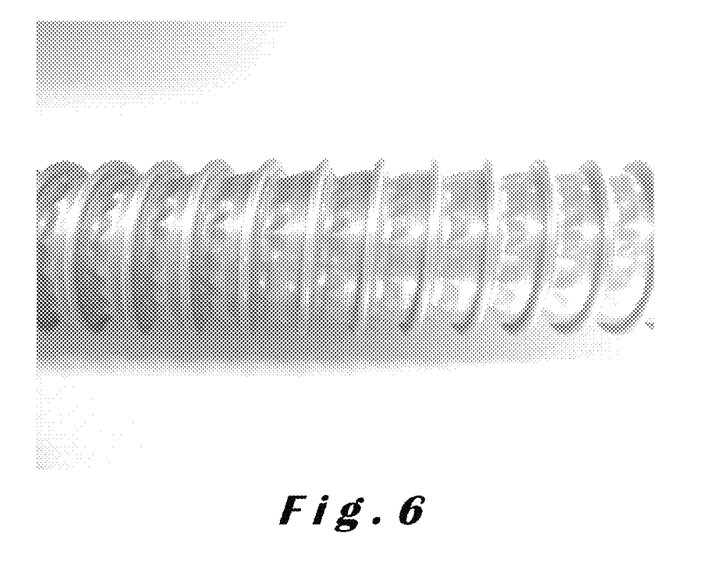
Figure 7:
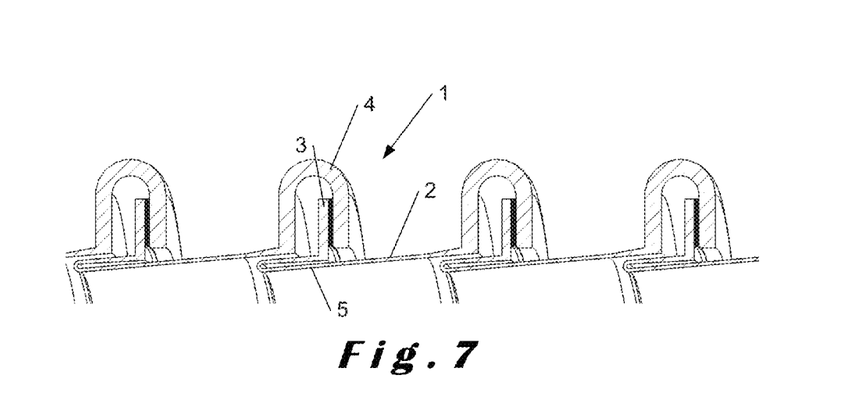
FIGS. 7 to 11 show alternative embodiments of the hose according to the invention.

FIGS. 7 to 11 show alternative embodiments with, respectively, the weld on the opposite side to shat shown in FIG. 3, an upright leg 6 which almost completely fills the U-shaped protrusion 4, a full protrusion 7, with a weld on the underside, a full protrusion formed by a half U-shape 8, an upright welded leg 9 and a more perpendicular hollow U-shaped protrusion 10.

Figure 10:
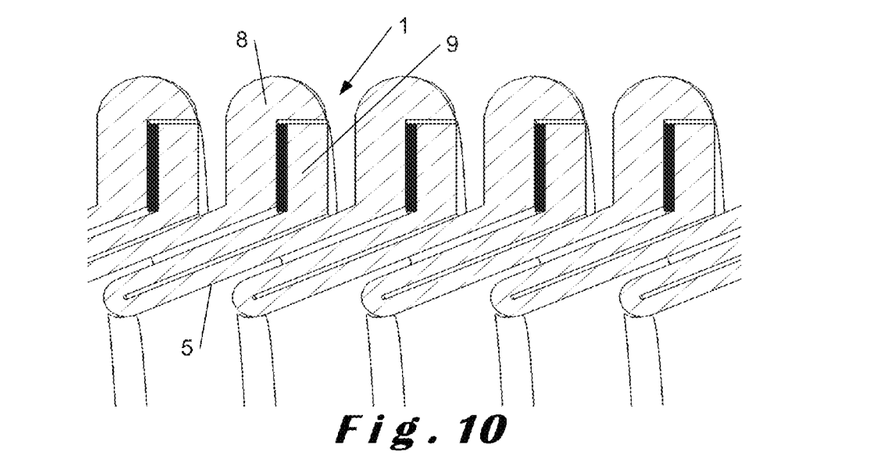
Figure 11:
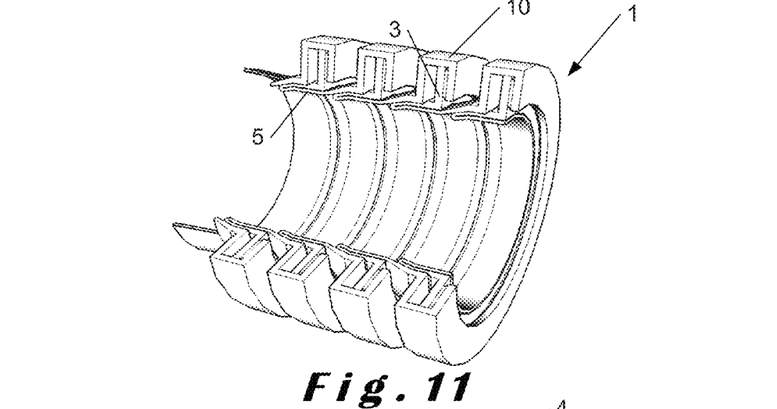

Moreover, in the embodiment shown in FIG. 10 the length of the unfoldable section is chosen so that the consecutive unfoldable sections 5 of consecutive windings rest against each other, which increases the stretch factor.

Another embodiment of the bottom is characterised in that bottom 2 is already bent in the "die" and is cooled in this way. The angular distortion may already be 180°, but smaller angles are also possible, e.g. 30° to 150°, or 60° to 120°, or approx. 90°. The embodiments shown in FIGS. 1-11 can also be obtained in this manner. When the hose is stretched the bottom is pulled straight, which also creates a tension in the bottom which is just sufficient to restore the hose to its original length with a fairly small force. This small force also applies to the straight bottom.

Depending on the profile, the extra length can be formed on the inside of the profile, the outer edge or somewhere in between.

By increasing the length of the bottom the stretch factor of the hose can also be changed by the same technique used to wind the hose. It is also possible to bend or fold the bottom (or another part of the profile) more than once during winding or beforehand in the "die", as in the embodiment shown in FIGS. 13 and 14.

The characteristics of the hose can be influenced by changing the shape and dimensions of the protrusion of the profile. For example, by increasing the size of the protrusion the hub strength of the hose can also be increased so that it is still large enough to resist the vacuum when the hose is in the bent condition or is fully stretched without the hose kinking under the influence of the vacuum.

Figure 8:
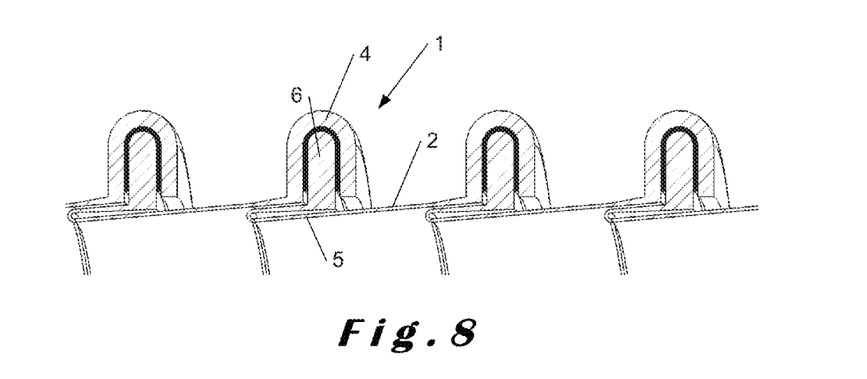
Figure 9:
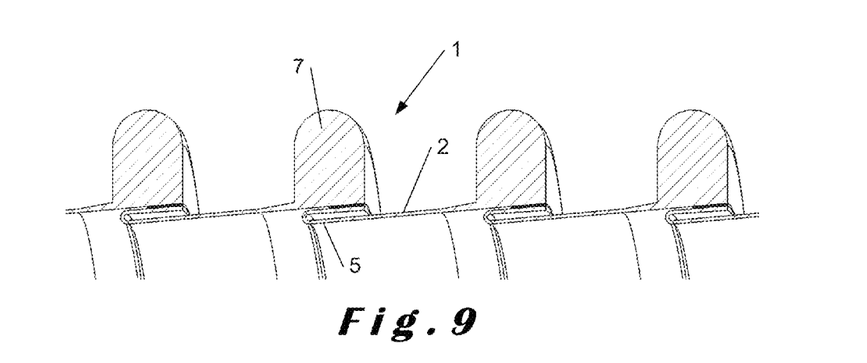

The flexibility of an ordinary vacuum cleaner hose of the state of the art is provided by the springing open of the protrusion in the outer radius of the hose and the movement of the bottoms towards each other in the inner radius when the hose is bent. In the case of the hose according to the invention the flexibility is also provided because the extra length built into the bottom of the profile stretches when the hose is bent on the outside of the bend. In some embodiments of the invention (e.g. those with a full protrusion, as shown in FIGS. 8-10), it is possible that the bottoms do not move towards each other or do so to a lesser degree on the inside of the bend, but this has no adverse effect on flexibility because the extra length on the outside of the bend compensates for this.

Because the weight of the extra length built into the profile can remain low, the weight of the hose per meter can be prevented from increasing appreciably compared to an ordinary vacuum cleaner hose.

Nevertheless a hose can be obtained with the invention which can be extended by a factor of 2 or more. This is highly advantageous, for example, in hoses used in central vacuum cleaner systems. In this case the length of a hose in current use, for example, may be approximately 9 meters, which makes it difficult to manipulate the hose. By using a stretch hose according to the invention here, with a stretch factor of 2 or more, the hose can also be made correspondingly shorter, which facilitates manipulation of the hose. Because the hose can be made shorter and the weight per meter is not substantially increased, the total weight compared to the weight of a 9 meter hose will be no higher and possibly even much lower.

In another embodiment of the hose according to the invention 1 or more profiles are spirally wound at the same time. The profiles may have the same shape or may also have different forms.

Figure 17:
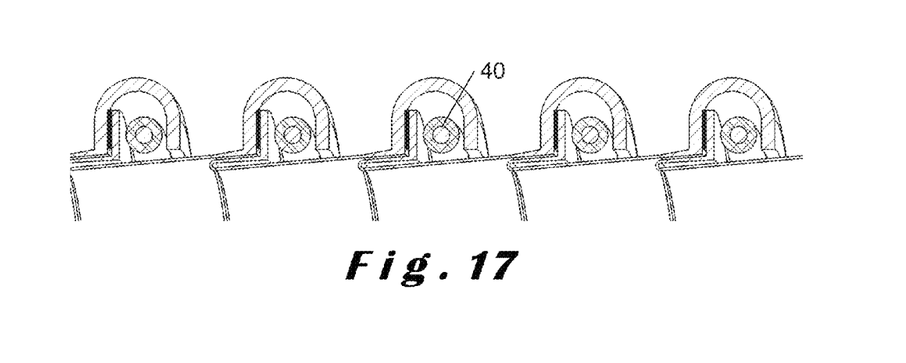

It is also possible to build electrical conductors 40 into the profile or into a plurality of the same or different profiles (see FIG. 17). Because it is possible to make the hose shorter (e.g. 4.5 meters with a stretch factor of 2 to arrive at 9 meters), an additional advantage is that a shorter length of electrical conductor is also required (50% less in the example), which can reduce the cost price of the hose and the weight considerably. By increasing the stretch factor the hose can be made shorter and a correspondingly shorter length of electrical conductors is also required (e.g. stretch factor 5, in which case a length of 1.8 meters is sufficient to obtain a hose with a final length of 9 meters).

The weight can also be lower compared to an ordinary conventional vacuum cleaner hose. If a hose according to the invention were to be made to a length of 1 meter, for example, with a stretch factor of 2 in order to arrive at 2 meters, the final total weight can be lower than that of a conventional vacuum cleaner hose of 2 meters which has little or no stretchability.

Figure 16:
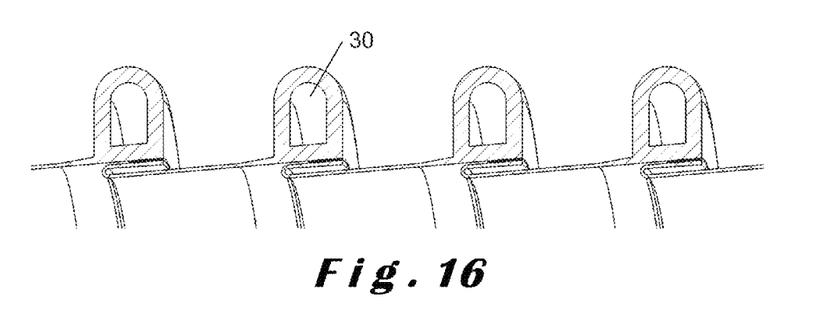

It is also possible to build into the profile not only the extra length but also hollow spaces 30 in order, for example, to transfer liquids spirally through the hose (see FIG. 16).

It is also possible to make the hose or a part thereof conical.

The protrusion (the rib of the spiral-shaped profile) has in most cases the shape of an inverse U and ensures that the hose is flexible and can be bent with a clearly defined bending radius. However, because extra length is built into the bottom of the profile in the above-mentioned embodiment, it is no longer necessary to give the flexible section of the hose a U shape. The U-shaped section can in principle have any shape and need no longer in itself be flexible because the flexibility may also or exclusively come from the extra length in the bottom. It is therefore possible to give the welded section all possible shapes (see, for example, FIGS. 7-11), and to produce it, if necessary, by means of co-extrusion.

The bottom of the profile can then be made in a highly flexible material, whilst the U-shaped section could be made in a hard material.

It is possible to wind the profiles obtained by co-extrusion singly or multiply, or to wind different profiles simultaneously.

In preferred embodiments of the invention the extra length of the bottom is folded towards the inside of the hose. The shape of the inwardly folded bottom is then chosen so that it is then correctly positioned to ensure that that on the inside the inside is still very smooth and the air resistance is not too adversely affected.

Figure 13:
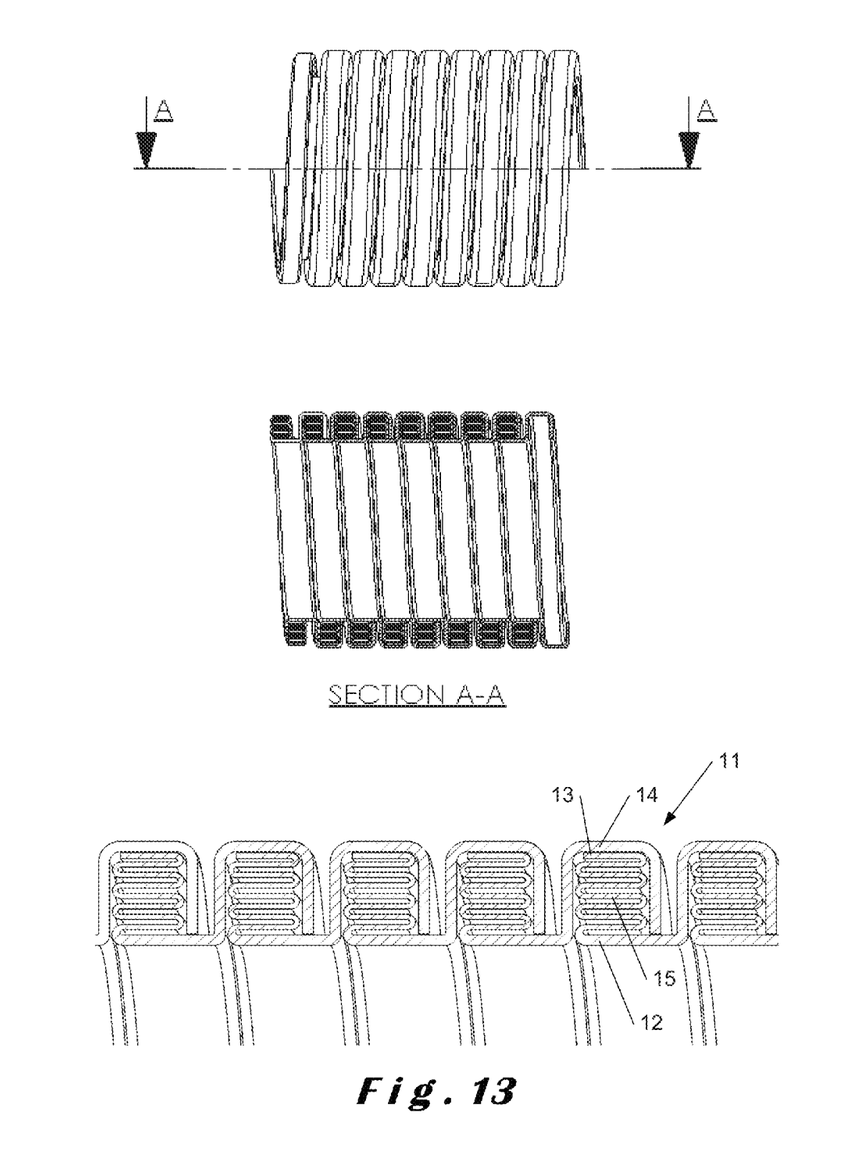
FIGS. 13 and 14 show another alternative embodiment of a hose according to the invention with an unfoldable section incorporated in the form of the rib section.
Figure 14:
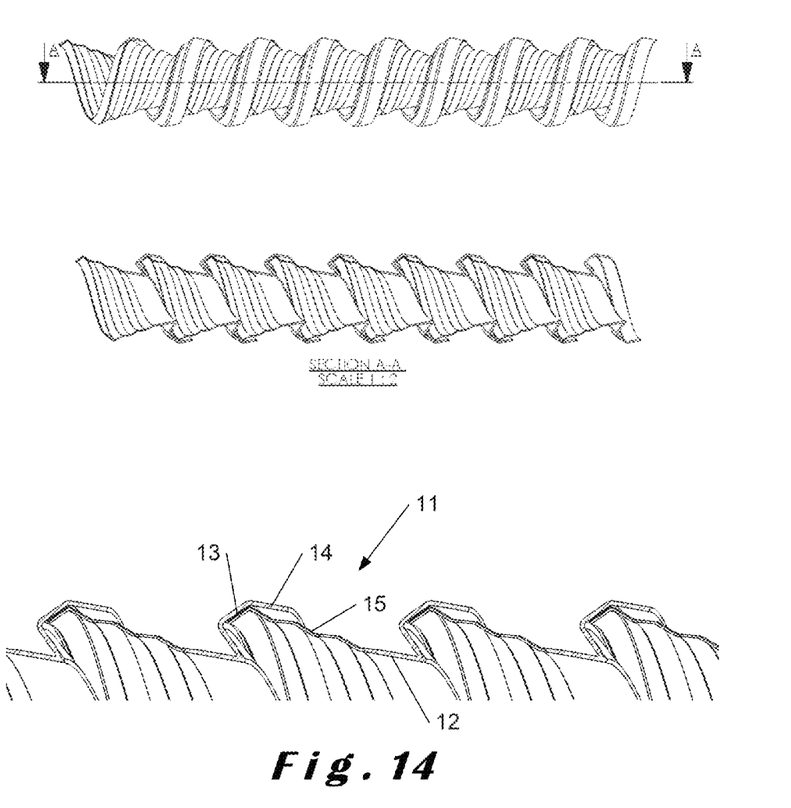

Another possible alternative profile 11 is to build in extra length under protrusion 14, as shown in the attached FIGS. 13-14. By making an unfoldable section 15 with a plurality of S forms above bottom section 12, covered by crown 14 of profile 11, extra strength length can be built in so that a stretch factor of over 6 can be achieved. Crown 14 of the profile will bend open when the profile stretches, enabling the folded up S shape to be stretched. In FIGS. 13-14 outermost leg 13 of unfoldable section 15 is a welded leg which is welded to the underside of crown 14. However, the welded joint can be placed both above or possibly on the left or right in the cover. If a weld is placed on the left or right, end 13 of the S shape may also be made vertical on the left or right. In FIGS. 13-14 the plurality of S shapes lie horizontally. However, it is also possible to place these S shapes vertically and to weld them securely to the sides or top.

In another possible profile according to the invention no suspended leg of the protrusion of the profile is provided in the protrusion. The weld is then placed between the vertically upright legs. The stretchable section of the hose then lies obliquely or rolled up underneath the vertically upright legs.

Figure 15:
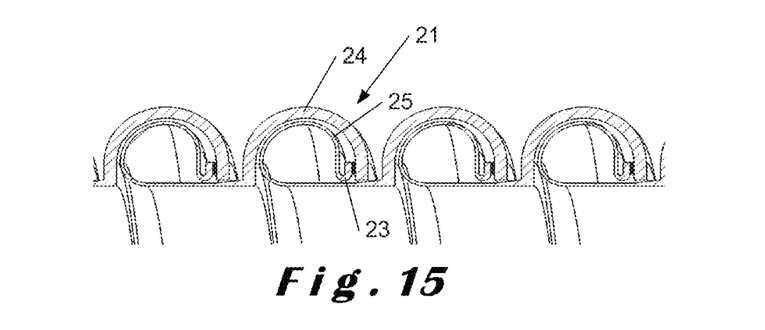
FIGS. 15 to 18 show further alternative embodiments of hoses according to the invention.

FIG. 15 shows another embodiment with a profile 21 with a double-walled protrusion 24-25, the innermost wall 25 of the protrusion being pulled outwards when the protrusion is stretched along the side on which U-shape 24 is detached. Here the innermost wall therefore forms the unfoldable section 25. Walls 24 and 25 are welded at their ends, for which purpose the inner wall has a small welded leg 23.

Figure 18:
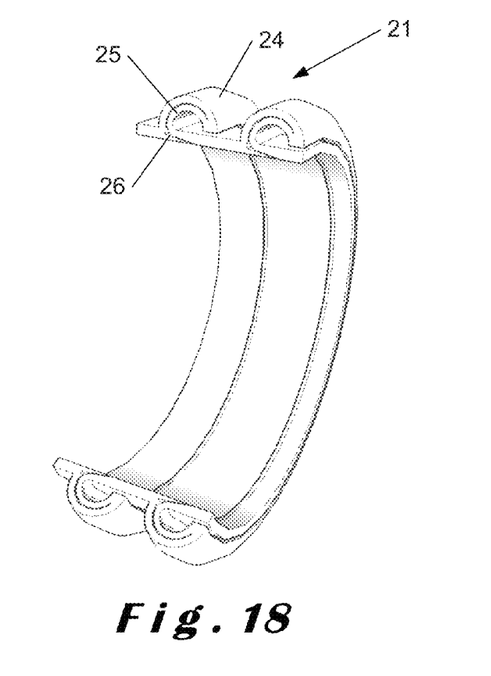

FIG. 18 shows a similar embodiment, also with a double-walled U-shaped protrusion, as in FIG. 15. In FIG. 18, however, a sealing leg 26 is added underneath the profile (on the inside of the hose), which leg keeps almost sealed the opening formed when the hose is stretched, which can limit the air resistance and accumulation of dirt during use. This sealing leg 26 can also be used in other embodiments shown and described. It is preferably wedge-shaped, but other shapes are possible.

Figure 19:
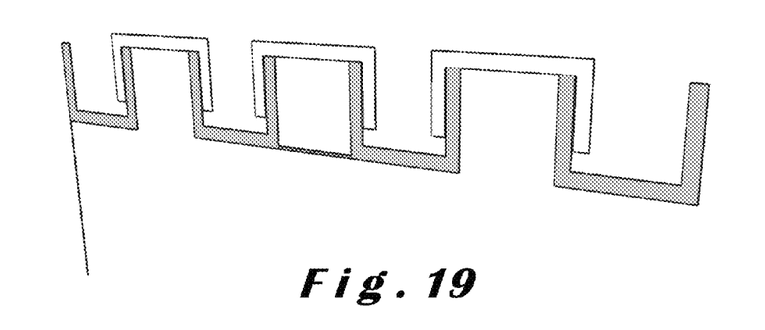
FIG. 19 shows an alternative embodiment of a stretchable hose with extensible profile windings.

Any other design of the hose can be obtained by winding 2 or more of the same or different profiles. For example, this can be achieved by winding 2 U-profiles which are, interconnected by a $3^{rd}$ flexible section, as shown in FIG. 19.

By working with right-angled U-profiles in preferred embodiments of the hose according to the invention, the upright legs being welded or nr not at all points, hoses can be obtained in which the consecutive spirals can be telescopically slide out of each other for stretching the hose. FIG. 19 shows a similar design. This alternative design may also give rise to a stretch hose with a high stretch factor. This design, with U-shaped profiles that can be displaced into each other, may or may not be combined with the other above-mentioned embodiments of the invention, some of the profile being "folded up" in the bottom or under the cap of the profile.

The invention claimed is:

1. A flexible stretch hose with a wall which comprises:
   an extruded and spirally wound profile in a plastic material,
   wherein consecutive windings of the profile are secured to each other by means of a weld,
   wherein the profile, in cross-section, has at least one bottom section and at least one rib section,
   wherein the rib section of the profile, relative to the bottom section, forms each time a protrusion of the wall of the hose which provides the hose with a predetermined hub strength, which is the extent to which the hose is resistant to radial compression and springs back to its original shape when a radial compressive force is removed,
   wherein the profile comprises an unfoldable section provided to be unfolded under the influence of a tensile force in the axial direction of the hose and to thereby allow an extension of the hose,
   wherein the unfoldable section comprises at least two profile sections lying loose against each other, which sections are interconnected at one end and
   wherein the hose is stretchable as a result of the unfoldable section up to at least 200% of the length in the unstretched condition.

2. The flexible stretch hose according to claim 1, wherein a recuperating effect is built into the unfoldable section, as a result of which the unfoldable section returns to the unstretched condition when the tensile force is removed.

3. The flexible stretch hose according to claim 2, wherein the recuperating effect is at least partially obtained by predetermined characteristics inherent in the plastic material from which the profile is produced.

4. The flexible stretch hose according to claim 2, wherein the recuperating effect is at least partially obtained because the unfoldable section is designed as a folded up straight section of the profile.

5. The flexible stretch hose according to claim 1, wherein the unfoldable section forms part of the bottom section of the profile.

6. The flexible stretch hose according to claim 5, wherein the bottom section is connected at one end to the rib section, which has an inverse U shape, and at the other end has an upright welded leg, where it is welded to the inverse U-shaped rib section of the next winding of the profile.

7. The flexible stretch hose according to claim 6, wherein the rib section is solid and is formed by the inverse U-shape and the upright welded leg of the next winding of the profile.

8. The flexible stretch hose according to claim 5, wherein the bottom section is connected at one to the rib section, which is solid, and in that the other end has a flat section where it is welded to the underside of the solid rib section of the next winding of the profile.

9. The flexible stretch hose according to claim 5, wherein the unfoldable sections of the consecutive windings lie adjacent to each other.

10. The flexible stretch hose according to claim 1, wherein the unfoldable section is received in the rib section of the profile.

11. The flexible stretch hose according to claim 10, wherein the rib section has an inverse U-shape which, in the unstretched condition of the hose, forms a housing for the unfoldable section, wherein the unfoldable section has a multiplicity of the profile sections lying loose against each other, the outermost of which is secured by means of the weld to the inside of the inverse U-shaped rib section of the next winding of the profile.

12. The flexible stretch hose according to claim 10, wherein the unfoldable section is formed by two inverse U-shaped sections of consecutive windings of the profile, the ends of which are secured to each other by means of the weld.

13. The flexible stretch hose according to claim 12, wherein the profile comprises a sealing leg for sealing a slot between the two inverse U-shaped sections level with the inner wall of the hose.

14. The flexible stretch hose according to claim 1, wherein the rib section has a hollow space for receiving a tube or one or more electrical conductors or for transferring a fluid.

\* \* \* \* \*